(12) United States Patent
Whitney (10) Patent No.: US 6,320,963 B1
(45) Date of Patent: Nov. 20, 2001

(54) SECRECY COVER FOR KEY PAD MATRIX

(76) Inventor: George R. Whitney, 3658 Pineridge Dr., Coeur d'Alene, ID (US) 83815

( * ) Notice: Subject to any disclaimer, the term of this patent is extended or adjusted under 35 U.S.C. 154(b) by 0 days.

(21) Appl. No.: 09/373,642

(22) Filed: Aug. 13, 1999

(51) Int. Cl.$^7$ .................................................. H04M 1/00
(52) U.S. Cl. ...................... 379/447; 379/368; 379/433.07
(58) Field of Search ..................................... 379/447, 368, 379/369, 370, 433.07

(56) References Cited

U.S. PATENT DOCUMENTS

| | | | |
|---|---|---|---|
| 3,927,282 | 12/1975 | Firstenberg | 179/178 |
| 4,135,074 | 1/1979 | Malacheski | 200/330 |
| 4,989,240 | * 1/1991 | Fuse et al. | 379/368 |
| 5,140,632 | 8/1992 | Anten | 379/447 |
| 5,301,230 | 4/1994 | Barry | 379/447 |
| 5,353,349 | 10/1994 | Brown | 379/450 |
| 5,359,658 | 10/1994 | Goodson | 379/447 |
| 5,465,090 | 11/1995 | Deignan | 341/22 |
| 5,509,224 | 4/1996 | Roy | 40/586 |
| 5,616,900 | 4/1997 | Seewoster | 235/379 |
| 5,748,728 | 5/1998 | Ginsberg et al. | 379/447 |
| 5,802,171 | 9/1998 | Deutsch | 379/419 |

* cited by examiner

*Primary Examiner*—Jack Chiang
(74) *Attorney, Agent, or Firm*—Keith S. Bergman

(57) ABSTRACT

A secrecy cover for a key pad having a 3×4 matrix of pressure operated depressible keys provides a five-sided casement defining a medial cavity to fit over a matrix of keys of the touch tone key pad to secret entry of one or more sequences of up to three sequential digits of a multidigit number entered into the key pads. The casement face provides at least two lineally arrayed unmarked operator keys that are depressible in predetermined sequence to move one of at least two elongate operator bars of operating mechanism carried within the casement chamber. Each operator bar carries a key depressor movable thereon between at least two alternative positions to depress one potentially depressible key pad key aligned beneath the operator bar. The key depressors are digitally movable by an operator to predetermined positions over a key pad key before placement of the secrecy cover on a key pad. An observer of the operation of the secrecy cover will not know which of the underlying key pad keys are depressed responsive to operation of a particular operator key, to provide secrecy for operation of up to three sequential key pad keys in one operation.

8 Claims, 3 Drawing Sheets

SECRECY COVER FOR KEY PAD MATRIX

BACKGROUND OF INVENTION

RELATED APPLICATIONS

There are no applications related hereto heretofore filed in this or any foreign country.

1. Field of Invention

This invention relates generally to protective devices that provide secret data entry for key pad matricies, and more particularly to a shielded interface that secrets the sequential operation of three key pad keys.

2. Description of Prior Art

Matrix type pressure operated key pads have become increasingly used in business transactions of various sorts such as in automatic teller machines (ATM's) and touch tone telephones. Often operation of such devices is carried out in public places, especially in the case of personal business transactions, where the operation may be observed by third party bystanders. The potentiality for fraud and dishonesty that may produce illegally begotten gains by such bystanders and losses by the key pad operators are always present, and personal safety may even be breached where information for key pad data entry is made available. An increase in fraudulent and other illegal activity has kept pace in rather direct proportion to the increased use of key pad operated devices in publicly accessible places for either business or personal transactions. This increase has become so marked and well known that significant numbers of knowledgeable people are afraid to use, or avoid use of, publicly available key pads and the operatively associated facilities for both business and personal transactions. The instant invention provides an interfacing device with a shielding cover between a user of a publicly available key pad and the key pad to allow operation of a key or of key sequences that are not visually determinable by an observer.

The problem of key pad privacy and security has heretofore been recognized and various particularized solutions have been proposed for its resolution. A first class of devices for this purpose has provided some type of visual barrier or shield to prevent, or at least lessen, the potential of third party observation of keyboard use. Such devices have provided direct digital input into the key pad by a user without any interfacing mechanism between the user and the keys of the key pad. A second class of devices has provided some mechanism interfacing between a user and a key pad that prevents third party knowledge of key operation from observation of manipulation of the interfacing mechanism, somewhat in the nature of a simplistic encoder. The instant invention provides a new, novel and improved member of this second class of device.

The first class of key pad security devices is distinguishable from the instant device, and other members of the second class of devices generally, by reason of essential structural differences that beget different functions and limit uses. With first class devices that provide visual shields associated with an entire key pad operated device, an operator or the environment about either generally must be quite large to define a volume large enough to enclose a user, the particular key pad associated machine or both. In many applications, if not most, these shields because of their size are not practically usable or economically viable for security purposes. Various members of this type of device such as a telephone booth or ATM kiosk not only are large, but also commonly do not completely shield key pad use from ingenuous or ambitious third parties.

Smaller shields of the first class may be carried in immediate proximity to the a pad or by a user's hands or arms. These devices share the problem of not preventing visual access of third parties from all positions and of inconvenience of use which varies somewhat in direct proportion to the degree of security provided by the shielding device.

Visual shields of the first class have not come into common use for security purposes in the present day marketplace, though many such devices have become known and used, especially for particular purposes. All of the first class of visual shielding devices are distinguishable from the instant mechanism by reason of their lack of provision for complete visual security for key pad operation without encumbrance of the ordinary operation of pad keys.

Devices of the second class that provide interfacing mechanisms between a user and a key pad, though known, are not so commonly used as are shielding devices of the first class. Most interfacing devices of the second class have had some other purpose, either primary or secondary, than concealing or attempting to conceal data entry into a key pad and by reason of the structures and functions required by this other purpose such devices generally have not been either practically feasible or economically viable to provide concealed, private data entry. Various of such interface devices have been developed since the advent of the matrix type touch tone telephone key pad and most commonly these devices have provided means to enlarge the operative surface of keys, to make the indicia carried by keys more readily visible, to make key operation more accurate and certain, to provide a memory of historical key operation, to provide better and more certain access to keys, or the like. This type of second class devices has generally provided only structures that are especially adapted for their particular purposes and those structures generally have not concealed input data or key pad operation, but rather, if anything, have made the use of the key pad more obvious to a third party observer. This type of device is readily distinguishable on this basis from the instant encoder type cover that provides no visual information of key pad operation.

Some few interface devices of the second class have provided a combined function of aiding keyboard operation and secreting or encoding data entry, and in the recent past devices to provide secrecy of key pad operational data by encoding or otherwise, without any other secondary purpose, have been developed. The second class devices having dual purposes in general have been more complex and cumbersome of operation than a device providing only a security function and consequently have been more difficult of understanding and operation by a user and more expensive of manufacture by providing mechanism to accomplish two different functions. These latter devices are distinguished on this basis from the instant security cover which provides only the single function of secrecy of data entry, with any other potential secondary benefits being only accidentally coincidental.

Known interface devices having the only purpose of maintaining secrecy of the operation of a key pad generally have had complex electrical, mechanical or electromechanical mechanisms interfacing between their own data entry system and a key pad to be operated to make such devices complex, difficult of understanding and operation and costly of manufacture. Such devices generally have programmed the entry of all of the digits of a multi-digit number to be entered into a key pad, which often extend to ten or twelve digits or more, and in general have required pre-programming by a user in some private fashion or place, often distant from the point of use, to maintain secrecy, with the device merely being applied to a key pad and activated to function automatically at the place of use.

In contradistinction to this type of secrecy device, the instant cover provides secrecy for only three sequential key operations in any single operational sequence of entering a number of more than three digits into a key pad and allows operation to program the device with the three secret digits in a public place and at the point and time of use. The programming operation may be easily secreted from an observer and, if it were observed, it would not provide knowledge of the key pad keys to be operated by a particular programmed state because the cover orientation on a key pad is determinative of the results of its operation. The operation of the instant cover is entirely mechanical and accomplished by simple structures to provide easy understandability and simple operation for a user, while maintaining low costs, reliability and long life with no maintenance cost for an expendable powering source such as a battery.

My invention lies not in any one of these features individually, but rather in the synergistic combination of all of its structures that necessarily give rise to the functions flowing therefrom as herein specified and claimed.

SUMMARY OF INVENTION

My invention provides a secrecy cover to fit over a 3×3 or lesser matrix of pressure depressive keys of common touch tone key pads to secrete entry of one or more sequences of up to three sequential digits in a multi-digit number entered into the key pad. The cover provides a rectilinear casement defining a medial cavity carrying operating mechanism to interface with an underlying key pad with up to three unmarked lineally arrayed operator keys movably protecting through the casement face. The operating mechanism provides three elongate bars movably mounted in the casement cavity in spaced parallel relationship perpendicular to the medial line through the operator keys and so arrayed that each bar is upwardly adjacent either a row or column of keys of a key pad matrix to be serviced. Each operator bar slidably carries a depending key depressor selectively movable between one of three positions of key pad keys beneath the bar. The elements of the operating mechanism are so related that when an operator key is depressed it will move the associated operator bar to depress the key depressor carried by that bar to operatively depress a key pad key therebeneath in a visually unobservable fashion. The key depressors may be positioned by an operator without viewing the positioning operation and with the secrecy cover in an unobservable place or position. The cover may be operatively positioned over a matrix of key pad keys with the operator keys orientated either vertically or horizontally.

In providing such a device, it is:

A principal object to provide a secrecy cover for key pads having depressive type keys that in a single operational sequence allows entry of up to three sequential numbers on a matrix of keys in a manner visually indeterminable by an observer.

A further object is to provide such a secrecy cover that defines a cavity carrying operating mechanism having three outwardly projecting operator keys associated with three elongate pivotally mounted operating bars arrayed to fit over rows or columns of a 3×3 or lesser matrix of keys with each operating bar carrying a key depressor selectively movable between three positions to depress the key pad key therebeneath responsive to motion of the associated operator key.

A further object is to provide such a secrecy cover wherein the key depressors may be positioned by a user in a public place without visual observation of the process by a third party.

A still further object is to provide such a secrecy cover that may be positioned with the lineally arrayed operator keys parallel to either columns or rows of a key pad matrix to be serviced.

A still further object is to provide such a secrecy cover that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention, however, it is to be understood that its features are susceptible of change in design and structural arrangement, with only the best known modes of the preferred and practical embodiment being specified and illustrated in the accompanying drawings as is required.

BRIEF DESCRIPTION OF DRAWINGS

In the accompanying drawings which form a part hereof and wherein like numbers of reference refer to similar parts throughout.

DESCRIPTION OF THE PREFERRED EMBODIMENT

My secrecy cover generally provides casement 11 carrying operator keys 12 that communicate with operating mechanism 13 carried within the casement cavity to operate keys of an adjacent underlying key pad 10 responsive to motion of the operator keys.

The ordinary "dial tone" telephone key pad 10 illustrated in FIGS. 1—8 provides a rectilinear 3×4 matrix of square pressure operated depressible keys 14 which operate switching circuitry of a telephone or other device to transmit a signal uniquely associated with operation of each key. For purposes of description of such key pads, the designations of top 18, bottom 19, right side 20 and left side 21 will be used herein and the vertical linear arrays of keys will be designated as columns 22 and the horizontal linear arrays as rows 23 in the ordinary matrix vernacular.

The keys 14 are of square cross-sectional configuration with concave upper surfaces 15 and are supported in key pad casement 16 with upstanding collars 17 about the lower portion of each key. The upper surfaces 15 of the keys normally are imprinted with identifying indicia 15a to provide visual identification of the keys for use. The uppermost left-hand corner of the telephone type key pad is identified by the numeral one and the keys to the right in each row are identified with successively increasing numbers. Each key in the left column increases by the next previously unused digit in the right column of the row thereabove, with the key in the lower right-hand corner of the upper 3×3 matrix of keys being identified by the number nine. The lowermost row of keys of the key matrix from left to right are identified with an asterisk (*), a zero (0) and a number sign (#). This array of key identifying indicia has become standardized and is used not only for identifying telephone numbers but also for transmitting numerical information relating to business transactions by use of touch tone telephones or other key pad operated devices. The size and configuration of such key pads and also of the keys thereon have generally become standardized. This type of touch tone key pad is one with which my secrecy cover is designed to operate.

Casement 11 of the secrecy cover is a rectilinear parallelepiped, normally but not necessarily of substantially square configuration, peripherally formed by structurally interconnected sheet-like top 24, bottom 25, right side 26, left side 27 and face 28 to define medial cavity 29. The structural joinder of these elements is preferably accomplished by formation of the casement as a unitary structure, such as by molding from a polymeric or resinous plastic, but other materials and formation processes are within the ambit and scope of my invention.

Face 28 defines three spacedly adjacent operator key orifices 30, in the instance illustrated configured as circles having their centers in lineal alignment along a laterally a medially line parallel to sides 26, 27. The size of the cavity 29 defined by the casement is such that the cavity will fit about and contain a 3×3 square or lesser matrix of keys 14 of key pad 10 when placed on the key pad surface, with such additional space as allows containment of operating mechanism 13 in space between the key pad keys and the cover face 28. The spacing between operator key holes 30 is such that the center of each hole will be adjacent the medial portion of three keys of an underlying row or column of a serviced key pad when the casement is placed on the key pad.

In the first sliding bar species of cover of FIGS. 14, each adjacent surface of casement sides 20, 21 define three spaced cooperating channels 31 arrayed in opposed pairs to slidably receive the opposed ends of operating bars to guide the bars in a perpendicular course toward and away from face 28 of the casement. Each cooperating pair of channels 31 is arrayed so that it is positioned at the ends of the rows or columns of key pad keys 14 extending between them. The channels 31 terminate spacedly distant from the lower edge of each side element to leave shelf-like alignment ledges 32 in their lowermost portion that maintain the operating bars in the associated slots and prevent them from moving outwardly through the orifice of cavity 29 aside from their alignment functions.

Operator keys 12 in the instance illustrated comprise cylindrical bodies 33 carried within casement cavity 29 to project through the operator key holes 30 and spacedly beyond the outer surface of face 28 of the casement. The inner portions of bodies 33 within cavity 29 define annular radially outwardly extending lower rims 34 that are larger than holes 30 to allow slidable axial motion of the keys in the holes but prevent the keys from passing outwardly through the holes. Casement facing portions 35 of the rims of the two outer keys may be removed if necessary so that the casement will not interfere with the motion of the keys.

The medial portions of the key pad facing surfaces of the operator keys 12 define axially aligned holes 36 to receive cylindrical compression springs 37 to bias the associated operator key to an outwardly extended position distal from an operator bar therebeneath. The compression springs 37 are maintained in holes 36 by frictional engagement and must project spacedly outwardly from the associated hole when in a relaxed state to serve their biasing function. This spring-biasing structure, however, is for operational convenience and is not required as an essential element of my secrecy cover.

Operating mechanism 13 provides "U" shaped operator bars each having elongate body 38 structurally supporting similar perpendicularly depending legs 39 at each end to fit within opposed cooperating pairs of channels 31 defined in the inner sides of the casement 11 for slidable motion in the channels with the operator bar body adjacent casement face 28. The elongate sides of body 38 carry similar opposed depending skirts 40 defining similar cooperating elongate ledges 41 extending inwardly toward the opposed leg to carry a key depressor between the legs 39 for sliding motion along the operator bar. The surface of operator bar body 38 distal from face 28 of the casement defines three spaced protuberances 42 each positioned over the medial portion of a key pad key in a row or column of a key pad therebeneath to aid positioning and positional maintenance of an operator key depressor in operatively depressing position relative to a key to be depressed.

Operating system key depressors 43 have a square cross-sectional configuration with a side length appropriate to allow the depressor to slidably fit between the inner opposed surfaces of skirts 40 of an operator bar and a perpendicular length sufficient to depress a key pad key therebeneath when the associated operator bar is depressed responsive to motion of the associated operator key. The opposed skirt facing sides of the key depressors 43 define similar grooves 44 configured to receive the opposed ledges 41 defined on the inner surfaces of the skirts 40 for slidable motion between the operator bar. Each depressor surface proximate to casement face 28 defines medial depression 45 to cooperatively receive one of the protuberances 42 carried by the associated operator bar to position the key depressor spacedly above a key of a column or row of keys of a key pad matrix therebeneath. The key depressor surface distal from casement face 28 is of a curvilinear configuration to complimentarily fit with the upper surface of a key to provide good and self-centering surface contact between these elements.

At least the casement and operating mechanism of the security cover are formed of somewhat resiliently deformable material, usually a polymeric or resinous plastic, that provides appropriate functional rigidity and wear resisting durability to serve its purpose, but yet allows sufficient deformation for assemblage of the device as described. The material of formation of the operator keys is not critical, but preferably it will be the same as that used for the other portions of the security cover. The overall sizing and dimensioning of the cover may vary somewhat while remaining within an operative range, but the configuration is essentially dictated by the configuration of a key pad which is to be serviced. In general key pad configurations are standardized in overall dimensions with keys arranged in similar cells of a rectilinear matrix which allows the secrecy cover to be applied to a 3×3 or lesser matrix of keys of most key pads with the array of operator keys parallel to either the rows or columns of the key pad keys.

A second species of secrecy cover having substantially the same casement 11a and operating keys 12a, but somewhat different operating mechanism 13a, is illustrated in FIGS. 5–8.

In the second species, casement 11a is of substantially the same size and configuration as casement 11 of the first species and defines similar medial cavity 29 and operator key holes 30. The casement 11a does not define channels in sides 26a, 27a as does the first species, but rather the sides 26a, 27a each define three spaced holes 46 arrayed in opposed, axially aligned cooperating pairs in both sides to receive pivotal jack axles of operator bars extending therebetween. The centers of the holes 46 are spaced at the same distance as that between two adjacent lines through the middle of two adjacent rows 22 or columns 23 of keys 14 of a key pad matrix to be serviced and in such array that a line through opposed holes will be parallel with a medial line through a column or row of a 3×3 or lesser matrix of keys covered by the casement 11a. The array of operator key holes 30 has similar spacing to those of the first species and preferably are similarly arrayed in a symmetrical pattern so that an observer cannot visually determine which opposed side is the top or bottom of the casement. The holes must also position operator keys carried therein so that their depending medial portion will contact an associated operating bar in a position to cause pivotal motion of the bar responsive to operator key depression.

Figure 1:
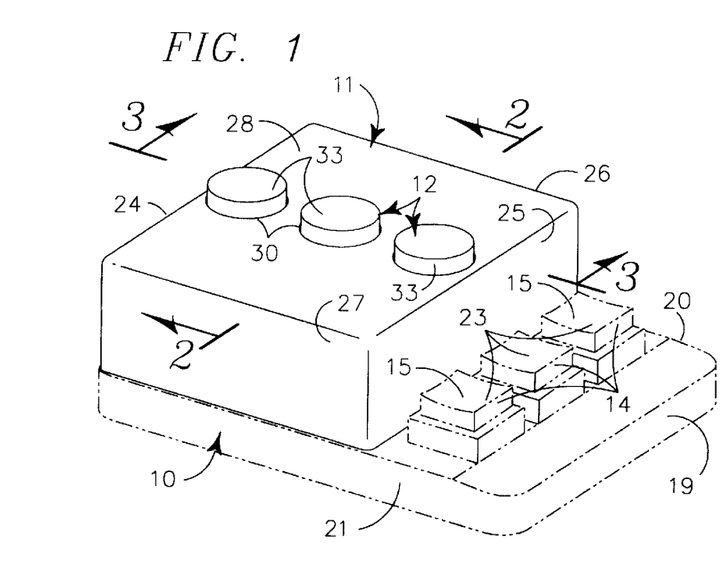
FIG. 1 is an isometric view of a first sliding bar species of secrecy cover in operative position on a 3×3 matrix of keys of a common square-key type touch tone telephone key pad with which it is operative.
Figure 2:
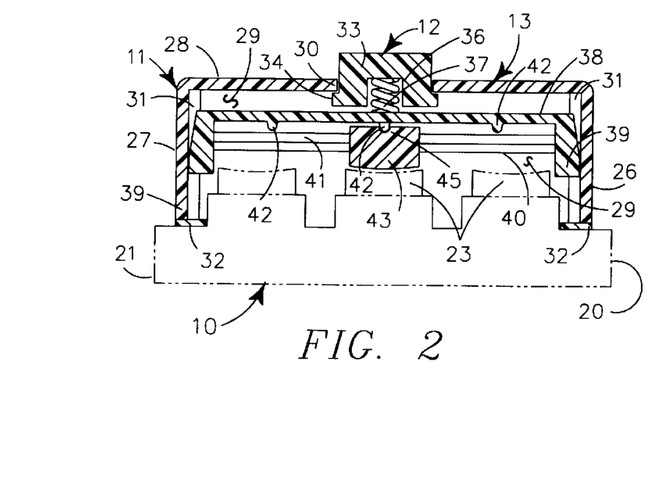
FIG. 2 is a vertical transverse cross-sectional view through the cover of FIG. 1, taken on the line 2—2 thereon in the direction indicated by the arrows.
Figure 3:
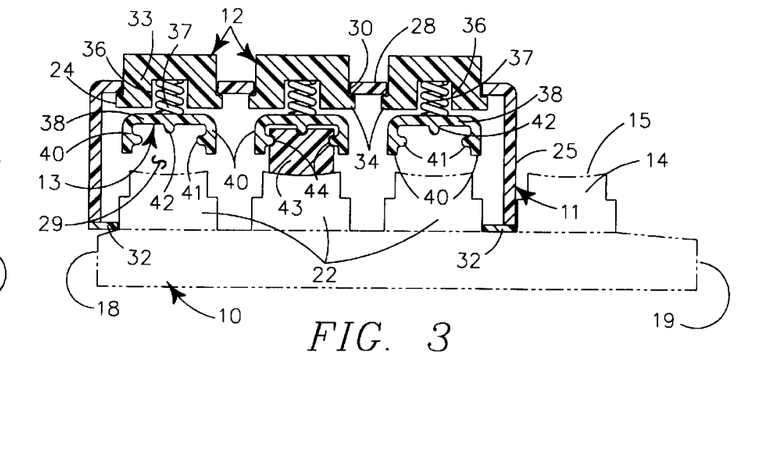
FIG. 3 is a vertical elongate cross-sectional view through the cover of FIG. 1, taken on the line 3—3 thereon in the direction indicated by the arrows.
Figure 4:
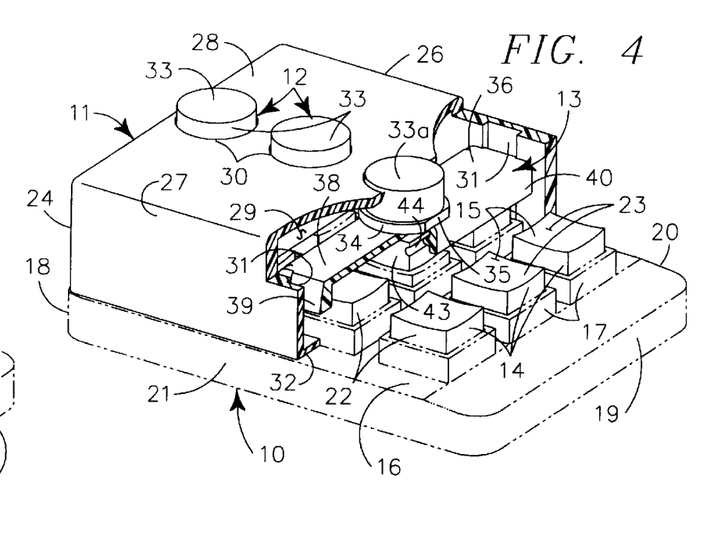
FIG. 4 is a partially cut-away isometric view of the cover of FIG. 1 showing the relationship of cover and key pad elements.
Figures 5, 6, 7, 8:
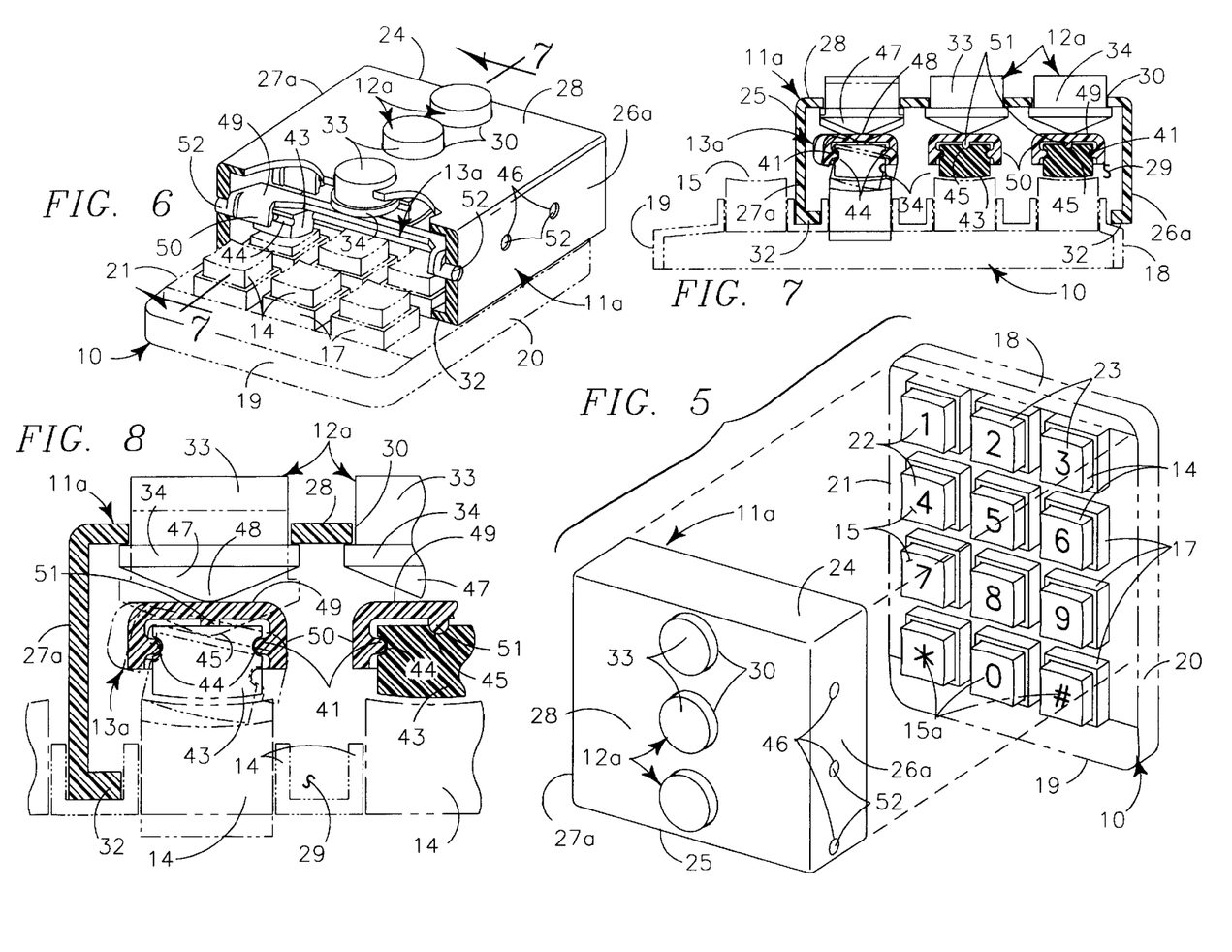
FIG. 5 is an isometric view of the second pivotal bar species of cover adjacent a 3×4 matrix of keys of a common square key type touch tone telephone key pad with which it is operative.
FIG. 6 is a partially cut-away isometric view of the cover and key pad of FIG. 5 in adjacent position to show the operative relationship of the devices.
FIG. 7 is a vertical elongate cross-sectional view through the cover of FIG. 6, taken on the line 7—7 thereon in the direction indicated by the arrows, with operator key motion shown in phantom outline.
FIG. 8 is an enlarged view of the left portion of the cross-sectional view of FIG. 7 to show details and motion of the operative mechanism.

Operator keys 12a of the second species provide substantially the same structure as those of the first species except for the key surface distal from the face 28 of the casement 11a, which in this instance defines pyramidal structure 47 with apex extending distally from casement face 28 to define a somewhat truncated and rounded end portion 48 to contact an operating bar spacedly distant from its axis to cause pivotal motion as illustrated in the cross-sectional views of FIGS. 7–8.

Operating mechanism 13a of the second species provides an operator bar having elongate body 49 structurally carrying similar, perpendicularly depending skirts 50 on its longer side edges. These skirts 50 each define similar elongate ridges 41 on their adjacent facing surfaces to slidably support associated depressors therebetween. The operator bar body 49 on its inner surface distal from casement face 28 defines plural spaced protuberances 51 similarly configured and positioned as the protuberances 42 of the first species to accomplish the same functions. The elongate lateral end portions of each depending skirt structurally carry similar axially aligned laterally extending jack axles 52 sized and configured to fit in journaling relationship in a pair of opposed, cooperating holes 46 defined in the opposed sides of casement 11a to pivotally mount the operator bars 49, 50 in cavity 29 defined by the casement, as illustrated especially in FIG. 6. The key depressors 43 of this second species of secrecy cover are the same as those of the first species with key depressor body 43 defining grooves 44 to fit between ridges 41 of operator bar skirts 50. Depressions 45 are defined in the depressor surfaces adjacent operator bar body 49 to cooperatively receive a protuberance 51 to aid positioning and positional maintenance of the depressor over a key of a key pad therebeneath.

Figures 9, 10, 11, 12:
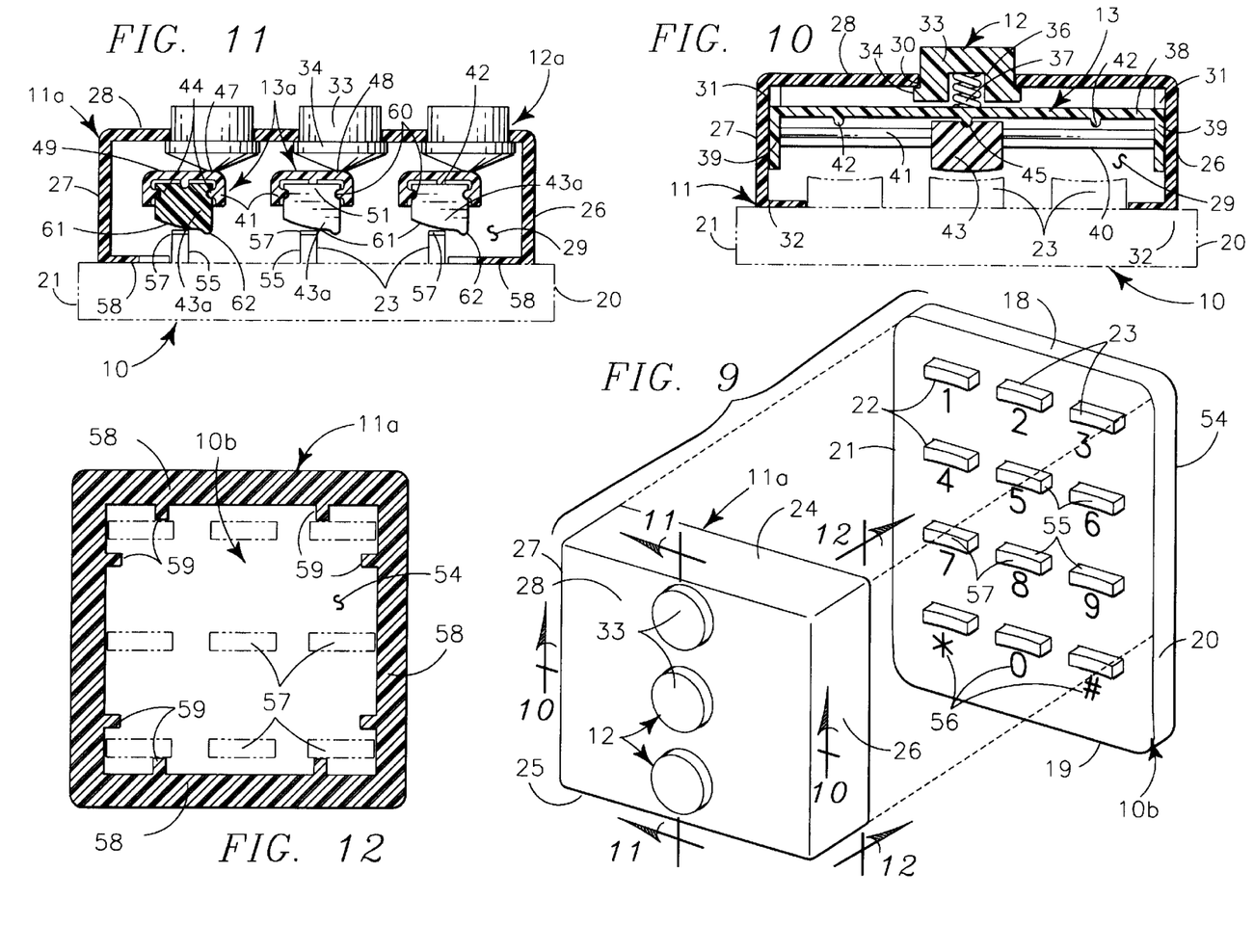
FIG. 9 is an isometric view of a common narrow key type key pad common in automatic teller machines with which the adjacent cover is operative.
FIG. 10 is a horizontal cross-sectional view through the cover of FIG. 9 in adjacency to the key pad, taken on the line 10—10 thereon in the direction indicated by the arrows, to show use of the first sliding bar species of cover with the narrow key type key pad.
FIG. 11 is a vertical cross-sectional view taken on a line such as 10—10 of FIG. 9 in the direction indicated by the arrows, to show the use of the second tilting bar species of cover with the narrow key type key pad.
FIG. 12 is a vertical cross-sectional view through the cover of FIG. 9, taken on the line 12—12 thereon in the direction indicated by the arrows, to show the alignment structure of the cover.

A common type of key pad 10b having narrow elongate keys on which my secrecy cover is usable is illustrated in FIGS. 9–11. This key pad provides flat base 54 carrying a 3×4 matrix of depressible keys 55, in the common orientation illustrated in FIG. 9 having longer horizontal extension and narrower vertical extension. The base 54 carries identifying indicia 56 associated with each key in the same ordered array as the indicia associated with the square key type key pad of FIGS. 1–8. Normally narrow keys have an elongate dimension approximately four times their width and commonly the outwardly extending surface of the keys 57 is of arcuate configuration. The base 54 defines top 18, bottom 19, right side 20 and left side 21 similarly to that of the square key type key pad, but normally does not have collars extending outwardly about the portion of the elongate keys adjacent the face of the base. The keys are arrayed in columns 23 and rows 22 in a matrix fashion similar to the square key type key board. Either the first or second species of my secrecy cover may be used with this type of key pad in the same essential fashion as with a square key type pad, with only slight modification to assure key pad key depression and alignment of the casement with this type of key pad.

A first species of cover that is operative with this narrow key type key pad is illustrated in FIGS. 9–10. This cover has substantially the same elements, structure and configuration as the first species of secrecy cover for use with square key type pad, but in this instance the casement must index on the key pad keys themselves rather than on collars thereabout as with the cover for a square key type pad. The sides 26, 27 of casement 11a in this instance are spaced apart a distance greater than the horizontal distance between the opposed ends of rows 23 of keys 55 to allow for the treater length of rows than of columns and yet allow the cover to maintain a square cross-sectional configuration so that its alignment on a key pad may not be visually determined from observation of the casement surface configuration. The inner edges of the sides, top and bottom of the casement structurally carry inwardly extending alignment shelves 58 to position the cover in horizontal alignment on the vertical sides of a 3×3 key matrix, with incrementally more distance between the inwardly facing adjacent edges of the alignment shelves than the distance between the laterally outer edges of a row of keys to allow key motion but yet maintain alignment. These alignment shelves may comprise a continuous element or a plurality of individual elements so long as at least two of the elements are positioned along the cover edges so that the individual elements contact the lateral surfaces of at least two keys of the outer columns of keys.

Since the distance between the laterally distant surfaces of a horizontal row 23 of keys 55 is greater than the distance between the vertically distant upper and lower surfaces of columns 22 of those keys, to provide appropriate vertical alignment of my cover on a narrow key type pad additional vertical alignment arms 59 are defined to extend inwardly toward each other from each of the adjacent surfaces of the opposed alignment shelves 58. These vertical alignment arms 59 are two in number on each alignment shelf and defined in opposed pairs, one of a pair on each alignment shelf, to extend inwardly toward each other with a distance therebetween incrementally greater than the distance between the distal surfaces of the outer keys in a column 22 to allow free depressive motion of the key pad keys. The alignment arms 59 must have particular configuration and array to serve their purpose of vertically aligning the cover on a serviced key pad without interferring with key pad keys in the laterally outer columns. This array must be such that at least one, and preferably two, vertical alignment arms 59 along each horizontal alignment shelf 58 extend adjacent to the surfaces of at least one key in both upper and lower rows 23 of a covered matrix and yet the alignment arms on the vertical alignment shelves extend in the spaces between the horizontal rows 23 of keys and do not contact the keys in any row. Various arrays and configurations of the alignment arms may satisfy this requirement, one of which is illustrated in FIG. 12 and hereinafter further described.

FIG. 10 illustrates the operation of the first species of secrecy cover with the narrow key type pad. The general structure and operating mechanism is substantially the same as that used with square key type pad except in this instance the legs 39 of the operating bar are somewhat thinner in their horizontal dimension. The operator keys and other operating mechanism are otherwise the same as in the first species for square key pads and function in the same fashion. Depressors 43 are slidably carried between operator bar skirts 40 for motion therealong to a position above one of the keys 55 of the narrow key key pad as determined by protuberances 42. With depressor 43 in appropriate position, when an operator key 12 is depressed to move inwardly into cavity 29, the lower surface of the depressor will contact the upper arcuate surface of key 55 therebeneath. Upon further inward motion the depressor 43 will operatively depress the adjacent key pad key to responsively transmit a signal from the key pad in the same fashion as with a square key type pad.

The cross-sectional view of FIG. 11 shows a security cover of the second species embodying a tilting type operating bar for use on a narrow key type pad. The cross-sectional view is one as taken on a plane through the cover of FIG. 9 indicated by the line 11—11 thereon in the direction indicated by the arrows. The casement 11a of this cover is formed with the same general configuration as that for the sliding bar type cover of the first species and the casement is aligned in either horizontal or vertical position on a 3×3 matrix of narrow type keys in the same fashion as the first species of cover of FIGS. 9–10 and 12. The operating mechanism of this cover is the same as that of the cover illustrated in FIGS. 5–8 when sized to fit within medial cavity 29 and position the operator keys 12a over the operating bars 13a as illustrated. The lower surface 61 of depressor 43a is modified as illustrated to define an asymmetrical arc with depending protuberance 62 on its lower lateral edge proximal to the edge of the operating bar that pivots downwardly. This configuration provides a somewhat smoother contact of the depressor with the underlying narrow type key and the depending protuberance 62 assures that the narrow key may not be depressed far enough to allow the pivoting depressor to pass over the key surface to prevent return to its null position. This depressor structure is only preferred, however, and is not necessary as a depressor with the same configuration as used with the second species cover for square keys is operative because its size and configuration normally prevent it from pivoting out of contact with the underlying narrow key when operatively moved.

Though covers have been described and illustrated for square 3×3 matricies of key pad keys this is not intended to be limiting and similar covers appropriately configured may be used on matricies of 2×2, 2×3 and 3×4 keys, though probably no so effectively so. The cover for a 2×2 matrix would allow the entry of only two secret numbers in a single entry sequence. The cover for a 3×3 matrix would allow the entry of two or three numbers depending upon the orientation of the operator bars relative to the longer dimension of the cover, but the cover configuration would visually indicate cover orientation. The 3×4 matrix cover would again indicate cover orientation and would allow entry of only three numbers in a single entry sequence.

Having described the structure of my secrecy cover the generic operation of both first and second species may be understood, and that operation is substantially the same for for either square or elongate key pads, though particular details vary somewhat by reason-of differences in structures and configurations.

A user of the security cover firstly determines whether the cover is to be used with the lineal array of operator keys 12 in vertical or horizontal orientation. After such determination, and with the configurational array of numeric keys on the matrix of a key pad to be used in mind, the operator positions the key depressor 43 associated with each operator bar to depress a key pad key 14 of the desired numeric value in a predetermined sequence. This positioning of the depressors is carried out by digital manipulation of the depressors in a place or position that is not visually observable, commonly by shielding the view of the manipulative process such as by turning the face of the secrecy cover toward any potential observers, carrying out the manipulation in a visually enclosed area such as defined by clothing, or accomplishing the operation in an otherwise visually private place. This manipulative process may be accomplished in the immediate vicinity of a key pad to be used.

The secrecy cover then is placed over the preselected matrix of keys of the pad in the pre-determined orientation. When the three secret numbers are to be entered, the operator keys 12 are depressed in the pre-determined sequential order to responsively depress the underlying keys of the key pad to enter the three predetermined numbers in proper sequence, or to enter less than three such numbers as may be desired. In the instance illustrated in FIG. 4 the lowermost operator key 33a would operate the numerical key "8" on a standard key pad. The determination of the orientation to be used with the secrecy cover in a particular instance and of the positioning of the key depressors prior to use are simple operations that become habitually familiar to a user after few experiences with the device to allow the setting manipulation to be rapidly carried out with secrecy in public places and without visual observation by an operator.

It is to be noted in using the secrecy cover that operator keys 12 may be depressed in any pre-determined order. In entry of digits in numbers having more than three digits the secrecy cover may be reset and applied to a key pad more than once in similar or different orientation to enter more than one three-digit sequences of numbers. The secrecy cover also may be used to enter less than three sequential digits in one or more sequences. The cover may be applied to any matrix of keys of common key pads up to an order of 3×4 with the lineally arrayed operator keys in either horizontal or vertical array.

With use of the secrecy cover in one particular orientation over a 3×3 matrix of keyboard keys, it is to be noted that only one key in a column or row perpendicular to the lineal array of operator keys may be chosen in a single application of the cover. There remain, however, many possible combinations of key choices, with different and multiple applications of the secrecy cover on a key pad and with different sequencing of operator key input, that the probabilities of a third party observer making either random or planned probabilistic determination of secret numbers entered is so small as to be practically insignificant.

As to the specific detailed operation of the first species of secrecy cover, after the device is programmed with key depressors 43 in proper position and the cover placed over a key pad, it will be properly oriented on the key pad by reason of the stops 32 communicating about the outer surfaces of upstanding collars 17 of the outer keys of the 3×3 matrix of key pad keys. When an operator key 12 is depressed its adjacent portion contacts the associated operating bar 38, 39 and as the operator key depression continues the operator bar is moved toward the underlying key pad. The associated key depressor 43 then contacts the key pad key therebeneath and depress that key to an operative position to responsively send the signal associated with that key through the electronic system associated by the key pad. The downward motion of the operator bar will be constrained toward the underlying key pad by reason of the containment of operator bar legs 39 in channels 31 defined in the casement 11 as well as the limit of motion of the key pad key. The operator keys, upon release, will be biased toward an outward position by reason of the bias of the depressed key pad key 14 and spring 37 carried by the operator key to extend between it and the adjacent surface of the associated operator bar.

In the second species of secrecy cover, the alignment of the cover on a 3×3 matrix of keys of a square key pad is the same as with the first species. When an operator key 12a is depressed the rounded apex portion 48 of the pyramidal surface 47 will contact the upper surface of operator bar 49, 50 and, as motion of the operating key continues, force will continue on the side of the operator bar opposite its pivot axis to cause the upper edge of the bar to pivot downwardly about the pivot axis to cause the key depressor carried thereby to pivot downwardly against an underlying key pad key to depress that key to responsively send a signal as in the case of the first species. Either species of operating mechanism is equally operable with my secrecy cover, but one or the other may provide desired ancillary benefits in particular structures and for particular purposes.

The operation of either species of cover on an elongate key type pad is essentially the same as with a square key pad, but the alignment structure of this type of security cover is somewhat different.

As seen in FIGS. 11–12, the secrecy cover for narrow key pads provides a casement Ha that has ledges 58 about its inner edge extending into medial cavity 29 to align the casement with the laterally outer columns of keys of a 3×3 matrix. The ledges 58 carry inwardly extending alignment arms 59 to align on the outer surfaces of the upper and lower rows of keys of the matrix. The alignment arms 59 are arrayed as illustrated in FIG. 12 so that when the operator keys are in vertical position the alignment arms contact two keys in each of the upper and lower rows of keys, but when rotated 90 degrees to a horizontal position the same alignment arms do not contact keys in the laterally outer columns, as seen in FIG. 12.

The operation of either species of operating mechanism is the same with the narrow key pad as described for the square key pad. The same key depressors illustrated in FIGS. 1–8 are operative with the secrecy cover for a narrow key pad, but the key depressor illustrated in FIGS. 11 with an arcuate lower surface 61 and stopping protuberance 62 is preferred for use with the second species of cover as it operates more surely and smoothly and extinguishes the possibility of a depressor pivoting off a key pad key.

Having thusly described my invention, what I desire to protect by Letters Patent and

What I claim is:

1. A secrecy cover, for a matrix type key pad with a plurality of pressure depressible keys arrayed in columns and rows having manually programmable operating mechanism to allow secret data entry into the key pad in a visually observable area, comprising in combination:

a casement having a face and defining a medial cavity to fit over and enclose at least a 3×3 matrix array of keys of the key pad;

at least three lineally arrayed operator keys movably carried by the casement to extend from the medial cavity, through the casement face and spacedly therefrom; and operating mechanism, carried by the casement in the medial cavity, communicating with the operator keys and having means for selectively depressing one key in each of three adjacent rows or three adjacent columns of a 3×3 matrix of key pad keys covered by the casement responsive to motion of the operator keys.

2. The secrecy cover of claim 1 wherein the operating mechanism compromises:

an elongate operator bar associated with each operator key, each said operator bar carried within the medial cavity to extend perpendicularly to the lineal to the lineal array of operator keys and move toward and away from the casement face, with an operating key depressor slidably carried by and movable on each operator bar between pre-determinable positions to depress one key pad key adjacent to the operator bar.

3. The secrecy cover of claim 2 wherein each operator bar is slidably carried by the casement within the medial cavity for perpendicular motion toward and away from the casement face.

4. The secrecy cover of claim 2 wherein each operator bar is pivotally carried by the casement within the medial cavity for pivotal motion toward and away from the casement face.

5. A secrecy cover for use on a square key matrix type key pad having a 3×4 matrix of similar pressure depressible keys, the secrecy cover having manually manipultable operating mechanism to interface with the key pad for secret entry of data into the key pad in a visually observable area, comprising in combination:

an open bottom generally rectilinear casement having similar opposed sides, a top, a bottom and a face extending therebetween to define a medial cavity to fit over and cover a 3×3 square matrix array of key pad keys having a medial laterally extending row and a medial vertically extending column of keys;

three operator keys movably carried by the casement to extend from the medial cavity, through the face and spacedly therefrom lineal array parallel to the casement sides, said operator keys arrayed vertically adjacent to three keys of the medial column of the 3×3 matrix of key pad keys covered by the secrecy cover;

three elongate operator bars carried by the casement sides for slidable motion toward and away from the face and extending perpendicularly to the lineally arrayed operator keys, with one operator bar adjacent each operator key for movement toward and away from the face responsive to motion of the associated operator key; and a key depressor carried by each operator bar and within the medial cavity for slidable motion between three predetermined positions and extending distally from the casement face to selectively depress one of three key pad keys adjacent the operator bar responsive to the associated operator key motion.

6. A secrecy cover for use on a square key matrix type key pad having a 3×4 matrix of similar pressure depressible keys, the secrecy cover having manually manipulable operating mechanism to interface with the key pad for secret entry of data into the key pad in visually observable area, comprising in combination:

an open bottom generally rectilinear casement having similar opposed sides, a top, a bottom and a face extending therebetween to define a medial cavity to fit over and cover a 3×3 square matrix array of key pad keys having a medial laterally extending row and a medial vertically extending column of keys;

three operator keys movably carried by the casement to extend from the medial cavity, through the face and spacedly therefrom in lineal array parallel to the casement sides, said operator keys arrayed vertically adjacent to three keys of the medial column of the 3×3 matrix of key pad keys covered by the secrecy cover;

three operator bars carried by the casement sides for pivotal motion toward and away from the face and extending perpendicularly to the lineal array of operator keys and spacedly inwardly from each operator key with one operator bar adjacent each operator key for pivotal movement toward and away from the face responsive to motion of the associated operator key;

a key depressor carried by each operator bar and within the medial cavity for slidable motion between three predeterminable positions and extending distally from the casement face to selectively depress one of three key pad keys adjacent the operator bar responsive to the associated operator key motion.

7. A secrecy cover for a matrix type key pad having a 3×4 matrix of elongate pressure depressible keys with lateral length greater than perpendicular width, the secrecy cover having manually manipulable operating mechanism to interface with the key pad for secret data entry into the key pad in a visually observable area said secrecy cover and alignment structure, comprising in combination:

an open bottom generally rectilinear casement formed by two similar opposed sides, a top, a bottom and a face extending therebetween to define a medial cavity to fit over and cover a 3×3 square matrix array having laterally extending rows and perpendicular vertically extending columns of elongate key pad keys, said casement having alignment ledges carried by both sides, the top and the bottom distally from the face to extend into the medial cavity equal distances that are incrementally distant from the distal edges of the opposed vertical columns of the covered 3×3 matrix of elongate key pad keys to horizontally align the casement on the covered matrix of elongate keys, and at least two spaced alignment arms extending spacedly inwardly into the medial cavity from each alignment ledge incrementally distant from the distal edges of the opposed horizontal rows of the covered 3×3 matrix of elongate key pad keys to vertically align the casement on the covered matrix of key pad keys said alignment arms arrayed to extend between horizontal rows of key-pad keys.

8. The secrecy cover of claim 7 further comprising:

three operator keys movably carried by the casement to extend from the medial cavity, through the face and spacedly therefrom to lineal array parallel to the casement sides and laterally adjacent each column of keys of a covered 3×3 matrix of elongate key pad keys;

three operator bars carried by the casement sides for motion toward and away from the casement face and extending perpendicularly to the lineal array of operator keys with one operator bar vertically adjacent each operator key; and a key depressor carried by each operator bar and within the medial cavity for slidable motion between three predeterminable positions and extending distally from the casement face to selectively depress one of three key pad keys adjacent the operator bar responsive to the associated operator key motion.

* * * * *